US008970514B2

(12) United States Patent
Gamble et al.

(10) Patent No.: US 8,970,514 B2
(45) Date of Patent: Mar. 3, 2015

(54) TOUCH SCREEN SURVEY METHOD AND APPARATUS

(75) Inventors: Richard Stephen Gamble, Coventry (GB); Simon John Rowland, Nuneaton (GB)

(73) Assignee: Customer Research Technology Limited, Coventry (GB)

( * ) Notice: Subject to any disclaimer, the term of this patent is extended or adjusted under 35 U.S.C. 154(b) by 542 days.

(21) Appl. No.: 13/063,665

(22) PCT Filed: Sep. 7, 2009

(86) PCT No.: PCT/GB2009/002148
§ 371 (c)(1),
(2), (4) Date: May 25, 2011

(87) PCT Pub. No.: WO2010/029289
PCT Pub. Date: Mar. 18, 2010

(65) Prior Publication Data
US 2011/0227852 A1    Sep. 22, 2011

(30) Foreign Application Priority Data
Sep. 11, 2008   (GB) .................................. 0816582.1

(51) Int. Cl.
*G06F 3/041* (2006.01)
*G06F 3/0488* (2013.01)

(52) U.S. Cl.
CPC .......... *G06F 3/0416* (2013.01); *G06F 3/04886* (2013.01)
USPC .......................................... 345/173; 345/157

(58) Field of Classification Search
CPC ..................................... G06F 3/0488
USPC ....................................... 345/173
See application file for complete search history.

(56) References Cited

U.S. PATENT DOCUMENTS

| | | | |
|---|---|---|---|
| 5,367,130 A | 11/1994 | Isono | |
| 5,862,223 A | 1/1999 | Walker et al. | |

(Continued)

FOREIGN PATENT DOCUMENTS

| | | |
|---|---|---|
| GB | 0816582.1 | 12/2009 |
| GB | PCT/GB2009/002148 | 12/2009 |
| WO | WO 00/02387 | 1/2000 |

*Primary Examiner* — Gregory J Tryder
*Assistant Examiner* — Sepideh Ghafari
(74) *Attorney, Agent, or Firm* — Wells St. John P.S.

(57) ABSTRACT

The invention relates to methods and apparatus for performing touch-screen surveys. The surveys comprise a plurality of screen displays each including a survey question and one or more screen buttons by means of which the user signifies an answer to the survey question by touching the screen button. A method of quarantining responses to a touch screen survey comprises defining a set of criteria for identifying if a response is likely to be a serious response or a nuisance response. The method includes monitoring the screen touches to determine the number of survey questions answered and the time intervals between screen touches. The monitored screen touches are compared with the defined criteria to categorize the response as a likely nuisance response or a likely serious response. The response is quarantined if it is categorized as a likely nuisance response. A method of discriminating between valid and nuisance responses comprises: monitoring screen touches; determining a same place touch count depending on a zone at which the screen is touched and the number of consecutive touches in the zone; comparing the same place touch count to a threshold; and determining if the response is valid or a nuisance response based on the comparison.

19 Claims, 7 Drawing Sheets

(56) References Cited

U.S. PATENT DOCUMENTS

| | | | |
|---|---|---|---|
| 6,093,026 A | 7/2000 | Walker et al. | |
| 6,456,952 B1 | 9/2002 | Nathan | |
| 6,513,014 B1 | 1/2003 | Walker et al. | |
| 6,616,458 B1 | 9/2003 | Walker et al. | |
| 7,523,045 B1 | 4/2009 | Walker et al. | |
| 2003/0063073 A1* | 4/2003 | Geaghan et al. | 345/173 |
| 2003/0076307 A1 | 4/2003 | Krajewski et al. | |
| 2004/0160425 A1 | 8/2004 | Krajewski et al. | |
| 2004/0160426 A1 | 8/2004 | DeGroot et al. | |
| 2006/0139340 A1 | 6/2006 | Geaghan et al. | |
| 2006/0224509 A1 | 10/2006 | Walker et al. | |
| 2006/0224510 A1 | 10/2006 | Walker et al. | |
| 2006/0235793 A1 | 10/2006 | Walker et al. | |
| 2007/0236478 A1 | 10/2007 | Geaghan et al. | |
| 2008/0150909 A1* | 6/2008 | North et al. | 345/173 |

\* cited by examiner

TOUCH SCREEN SURVEY METHOD AND APPARATUS

CROSS REFERENCE TO RELATED APPLICATION

This application is a 35 U.S.C. §371 of and claims priority to PCT International Application Number PCT/GB2009/002148 (Publication No. WO 2010/029289 A1), which was filed 7 Sep. 2009, and was published in English, and this application claims priority to UK Patent Application No. 0816582.1 which was filed 11 Sep. 2008, and the teachings of which are incorporated herein by reference.

FIELD OF THE INVENTION

The present invention relates to methods and apparatus for performing touch-screen surveys.

BACKGROUND

Touch screen technology is now used widely as an alternative to over-the-counter or person-to-person interactions for a wide variety of commercial activities. For example touch screen terminals can be found in public areas such as airport terminals and railway stations to enable customers to check in for flights or purchase tickets. However, surveys may be carried out using a variety of computerised touch-screen survey equipment, for example personal computers (PCs), Tablet PCs or personal digital assistants (PDAs).

The touch screen displays a sequence of questions or instructions that the customer responds to by touching a particular area of the screen (usually displayed and referred to as a button). The touch screens include sensors (for example capacitive sensors) that detect the location of the screen surface at which the customer touches the screen, and thereby detect when a button has been touched. Touch screen surveys employ this technology to obtain customer responses to questionnaires, usually by locating a touch screen terminal nearby a point of sale. For example, a touch screen survey terminal may be placed close to the checkouts in a supermarket, so that a customer leaving the checkout is able answer market survey questions relating to the purchase of goods in the supermarket. The touch screen will display a series of questions together with answer "buttons" from which the customer can select an answer by touching the appropriate button.

One problem with these touch screen surveys is that a significant proportion of survey responses are not serious, but are nuisance responses. These may arise as a result of people playing with the touch screen apparatus without considering the questions posed. For example, a person (possibly a child) playing with the apparatus may just touch the screen at random locations, or repeatedly at the same location. In other cases, respondents may just touch buttons in a repetitive or random fashion without bothering to read the questions, or may start answering questions and then just walk away without finishing the survey. Another form of nuisance response may arise where people seek to try and manipulate the statistical results (for example members of staff in the organisation to which the survey relates). It has been found that as many as 30% or more of recorded survey responses can be nuisance responses of this nature. It is therefore necessary to decide, for each recorded response, whether or not the respondent was seriously answering the survey questions. One way to do this is for a person to review the responses of every survey, which is a time-consuming human occupation. However, some nuisance responses may not be readily apparent to the reviewer or may be impossible to identify even by human intervention.

The present invention has been conceived with the foregoing in mind.

SUMMARY OF THE INVENTION

According to a first aspect of the present invention there is provided a method of discriminating between valid and nuisance responses to a touch screen survey. The survey comprises a plurality of screen displays each including a survey question and one or more screen buttons by means of which the user signifies an answer to the survey question by touching the screen button. The touch screen comprises a plurality of zones, each zone being an area of surface of the touch screen. The method includes: monitoring screen touches; determining a same place touch count depending on a zone at which the screen is touched and the number of consecutive touches in the zone; comparing the same place touch count to a threshold; and determining if the response is valid or a nuisance response based on the comparison.

It is an advantage that, by monitoring the number of consecutive touches in a zone, and determining a same place touch count, an automated assessment is made as to whether or not the survey response is a serious, valid response, or whether it should be categorised as a nuisance response with repeated touches on the same part of the screen.

In embodiments of the invention, determining the same place touch count comprises: identifying a screen touch as a valid tap when the user touches the screen in a zone that comprises a screen button and assigning a valid tap rating to the screen touch; identifying a screen touch as an invalid tap when the user touches the screen in a zone that does not comprise a screen button and assigning an invalid tap rating to the screen touch; and incrementing the same place touch count by an amount corresponding to the assigned tap rating.

It is an advantage that the operator can set or adjust the level of automated discrimination between valid and nuisance responses by setting the valid and invalid tap ratings.

In embodiments of the invention the method also includes quarantining the response if the determination is made that it is a nuisance response.

In embodiments of the invention, the method may further comprise defining the plurality of zones. The plurality of zones may be defined by specifying a grid of zones. The grid of zones may be defined by specifying a number of horizontal grid lines and a number of vertical grid lines. Alternatively, the grid of zones may be defined by specifying a number of rows of and a number of columns in the grid.

In embodiments of the invention, the zones may be predefined.

According to a second aspect of the present invention there is provided touch screen survey apparatus. The apparatus comprises a touch screen operable to detect a location of the touch screen surface touched by a user and to display the survey as a plurality of screen displays each including a survey question and one or more screen buttons by means of which the user signifies an answer to the survey question by touching a screen button. The touch screen comprises a plurality of zones, each zone being an area of surface of the touch screen. A processor is operable to control the presentation of the screen displays, to monitor screen touches, to determine a same place touch count depending on the zone at which the screen is touched and the number of consecutive touches in the zone, to compare the same place touch count to a threshold, and to determine if the response is valid or a nuisance response based on the comparison.

In embodiments of the invention, the apparatus comprises an operator interface operable for entering a valid tap rating and an invalid tap rating. The processor is operable to: identify a screen touch as a valid tap when the user touches the screen in a zone that comprises a screen button; identify the screen touch as an invalid tap when the user touches the screen in a zone that does not comprise a screen button; and to increment the same place touch count by an amount corresponding to the tap rating of the screen touch.

The operator interface may be operable for entering instructions including definition of a plurality of zones, each zone being an area of surface of the touch screen and/or a threshold same place touch count.

The apparatus may comprise a computerised touch screen survey device such as a personal computer, Tablet PC, personal digital assistant or a touch screen terminal.

According to a third aspect of the present invention there is provided a method of quarantining responses to a computerised survey. The survey comprises a plurality of screen displays each including a survey question and one or more screen buttons by means of which the user signifies an answer to the survey question by touching the screen button. The method includes defining a set of criteria for identifying if a response is likely to be a serious response or a nuisance response. The criteria are based on the number of survey questions answered and the timing between answers to survey questions. The screen touches are monitored to determine the number of survey questions answered and the time intervals between screen touches. The monitored responses are compared with the defined criteria to categorise the response as a likely nuisance response or a likely serious response. The response is quarantined if it is categorised as a likely nuisance response.

The criteria may include one or more of:
a maximum number of answers in a time period;
a minimum time between survey responses;
a minimum number of questions answered;
a maximum time between answers;
a maximum number of screen touches in the same screen location;
a minimum number of selected answers to a question where multiple answers can be provided;
a maximum number of selected answers to a question where multiple answers can be provided;
a maximum number of touches to a "previous screen" or "previous question" button;
bad language used in a response;
repeating letter sequences in a response;
repeat pressing of a "previous" button;
an out of hours response entry;
conflicting answers.

BRIEF DESCRIPTION OF THE DRAWINGS

FIGS. 2 to 5 are example screen illustrations of a sequence of survey questions.

Referring to FIG. 1, a touch screen survey system includes a touch screen 10, which is linked for electronic data communication to a processor 12. The processor 12 may be contained within a common housing with the touch screen 10, or may be located apart or remotely from the touch screen 10, in which case the data communications may be wireless or via a wired connection. The processor is similarly linked to a memory 14. The memory 14 stores data of three distinct types, and these may be stored at a single memory location (for example on a single memory device such as a computer disk drive) or at a plurality of memory locations. The stored data includes program instructions and data 16 relating to a survey, and these are used by the processor 12 to control the display of survey questions on the touch screen 10. The stored data also includes any survey responses 18, and any quarantined survey responses 20, these being responses that have been quarantined in accordance with the methods described below. As with the processor 12, the memory 14 may be local to or remote from the touch screen 10.

Figure 1:
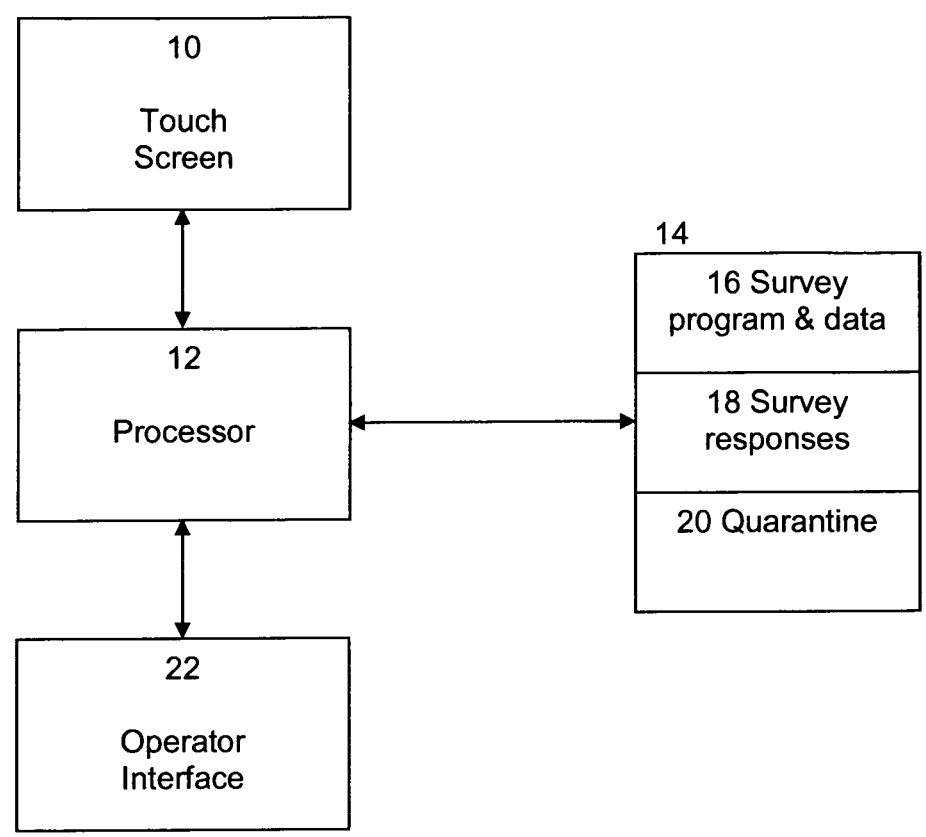
FIG. 1 is schematic layout of a touch screen survey system.

The system also includes an operator interface 22, which enables the operator of the touch screen survey to set up or adjust the parameters that control the processing of the survey. The operator interface 22 may be a separate interface (e.g. a screen and keyboard), or even a separate computer linked to the processor 12. Alternatively, the operator interface may use the touch screen 10, with the operator able to gain access to the survey set-up parameters by using a secure entry (e.g. a password).

The touch screen 10 includes a display screen on which survey questions are presented together with one or more buttons corresponding to the possible answers that a customer can give. The touch screen also includes sensors that detect the location on the screen where it is touched (e.g. by the customer's finger) and can thereby detect the touching of a button when a question is answered.

To avoid the need for someone to review all the survey responses to determine which are serious and which are nuisance responses, the present invention provides a method to automatically determine if a response can be categorised as a serious response (or at least one that is likely to be serious) or one that is likely to be a nuisance response. Based on this determination, nuisance responses can be quarantined—i.e. recorded and stored as a quarantined response 20 in the memory 14. The method involves monitoring the touch screen responses, particularly the number and location of screen touches and the time intervals between touches, and comparing these with predetermined criteria. Based on the comparison the response can be categorised as a serious response or a nuisance response. Examples of criteria that may be used to categorise the responses are given below.

Questions Answered Too Quickly

Every time a question is answered and the screen touch is captured on the system, the processor 12 logs the date and the time of that answer (creates a time stamp for the answer). If a customer answers, say, more that 3 questions within a 5 second period then this is deemed to be too quick so that the response is categorised as a nuisance response and is quarantined. The parameters for this criterion can be controlled by the operator, via the operator interface 16, by setting a minimum time x seconds to answer a number y questions.

Time Between Surveys

The Operator is able to set a minimum time between surveys. This means that if a new survey is started within the specified minimum time (30 seconds for example) of the previous survey being finished then the response is deemed to be a nuisance response and is quarantined. If the minimum time is set to zero seconds then quarantining based on this criterion is effectively switched off. A positive value for the time between surveys will mean that the time elapsed between consecutive surveys will be analysed by comparing the time stamp from the last answer in the preceding survey and the time stamp from the first answer in the following survey. If the time difference between the time stamps is less than or equal to the set minimum time between surveys, the second of the two survey responses is quarantined.

Minimum Number of Questions Answered

The operator is able to set a minimum number of questions answered to make the survey valid. For example, if the minimum is set as 5 this would mean that as long as the customer answered the first 5 questions then the response would be categorised as serious. Note that, in some surveys, it may be possible for a question to be skipped, in which case that question would not be counted as one of the first 5.

Minimum Number of Expected Answers

Some survey questions may allow more than one answer. These are referred to as 'multi-choice' or 'multi-select' questions. The customer can choose any or all of the responses on the screen. The operator can set the system to automatically quarantine survey responses when the number of answers to a 'multi-choice' or 'multi-select' question is less than a minimum number of answers for that question. If the minimum is set to zero for a question, then the auto quarantine is switched off for that question.

Maximum Number of Expected Answers

For 'multi-choice' or 'multi-select' questions, the customer can choose any or all of the responses on the screen. Although this may be valid, the likelihood is that if all or most answers are chosen then the survey is not being taken seriously. Therefore the operator is able to set a "maximum" number of answers for this type of question. The system automatically quarantines a response as a nuisance response when the number of answers to a 'multi-choice' or 'multi-select' question is greater than the set maximum for that question.

Inactive Timeout Threshold

During a survey as well as logging the time and date of the response answers the processor 12 is configured to start running a clock after each answer until the next answer. The "Inactive Timeout Threshold" is set by the operator as a maximum time between answers, so that if a customer starts a survey and then walks away half way through, the clock will continue running until the threshold time is reached. The system then re-sets ready for the next survey. The set of answers recorded in the response is quarantined as a "Timed Out" nuisance response unless the customer has answered more than the "Minimum number of questions answered", and they were not answered too quickly (as described above), in which case the response is categorised as a likely serious response.

Same Place Touch

This criterion guards against a user pressing the same place on the screen every time when going through the survey. The operator can set a parameter on the system specifying the maximum number of "same place touches" to determine if the survey response should be categorised as serious or as a nuisance response to be quarantined. This criterion is described in more detail below with reference to FIGS. 2 to 5.

Bad Language

Some survey questions are open-ended questions in which customers are presented with a touch keypad that they can use to type in an answer. Unfortunately, some customers may use bad language or inappropriate text in their answers. Responses containing such language may be quarantined as nuisance responses. The system memory 14 may include a database of inappropriate or bad language terms. Operators may also have the option to add words or phrases to their operator-specific database. The database can then be used in conjunction with a bad language filter to identify where such language is used in an answer. If the operator sets the bad language filter to "on", all the answers to "open-ended" questions in the survey responses are analysed to determine if any text strings in the answers match bad language terms in the database. If a match is found, then depending on how the operator has configured the survey, either the whole response is categorised as a nuisance response and is quarantined, or just the answer containing the bad language is quarantined.

Repeating Letter Sequences

In addition to the language filter described above, if the text in an answer to an open-ended question contains a letter that is repeated in sequence three or more times then this is an indication that the survey, or at least that particular question in the survey) is not being taken seriously. In that case the processor 12 may be set to analyse the text and to quarantine the response (or at least the text answer containing the repeating letter sequence). For example, a text answer containing any of the following would be quarantined:

"aaa"

"aaaaa"

"yyyfffjjlllllllllllll"

However, an answer containing repeating numbers such as "999" would not be quarantined.

Repeat Pressing on "Previous" Button

Many touch screen surveys include a "Previous" button, available on all screens except the first. This button allows the customer to go back to a previous question if they believe they have made an error. Therefore, it is possible to press the "Previous" button multiple times to get back to the first question.

However, depending on the nature of the survey, it may be undesirable for the customer to go back and change answers to too many questions, especially if the survey is intended to illicit a customer's first reaction to a question or their initial impressions. Therefore, the operator is provided with the ability to set a maximum figure for the number of times the user can press the "previous" button. If this maximum number is exceeded, the response is categorised as a nuisance response and is quarantined.

Out of Hours Response

Where the survey is carried out on premises, such as a retail outlet, that has set opening hours, then any response entered outside the opening hours could not be made by a customer. In that case, the time at which the response was entered is recorded and is compared with the opening hours. If the response is entered at a time that falls outside the opening hours, the response is quarantined.

Conflicting Answers

An indication that a response is not serious, or may be being manipulated can arise if the answers to two or more questions are clearly inconsistent. For example if the respondent is asked to enter his/her age, and the reply is 16 years old, and is later asked how many children they have, and the answer is 6, then this is clearly incorrect, so the response is quarantined.

Figure 2:
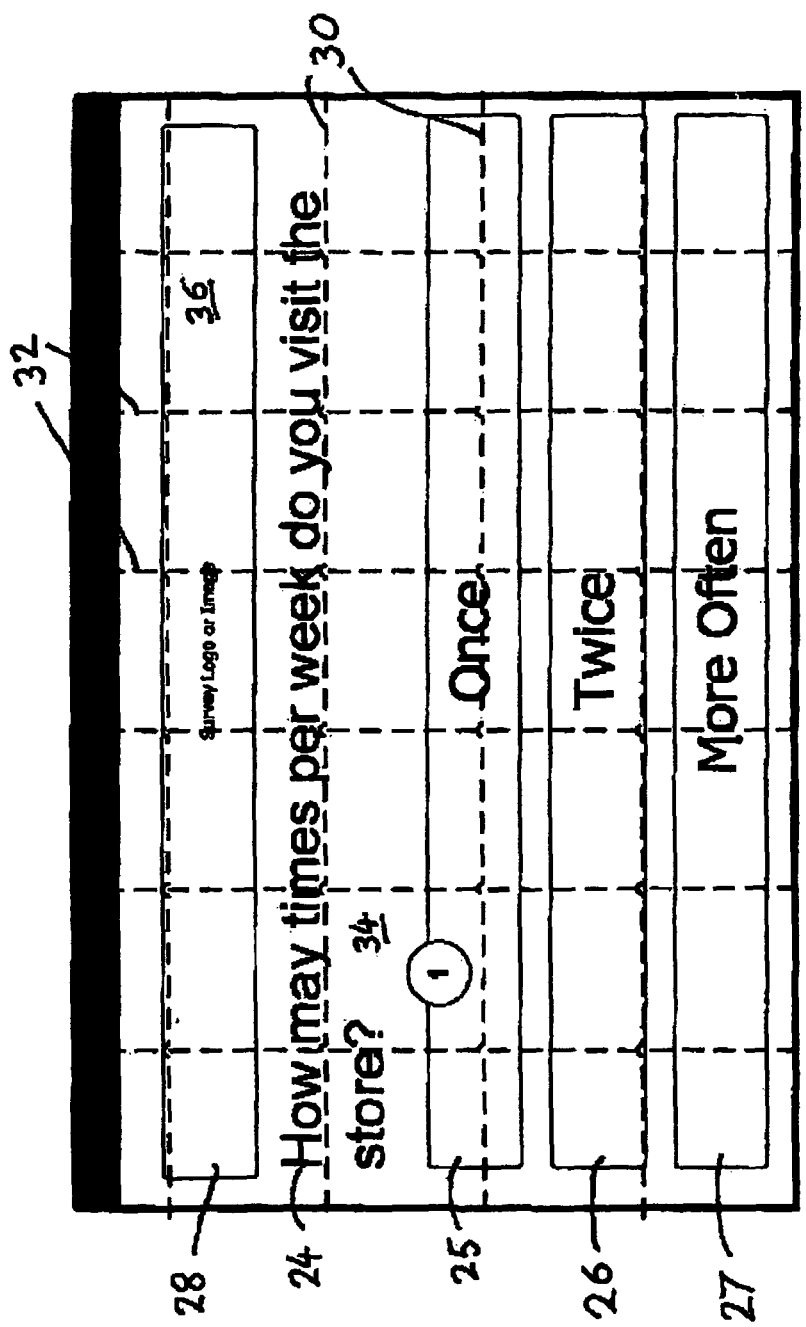

FIG. 2 is an illustration showing an example of a typical touch screen survey display, as might be displayed on the touch screen 10 of FIG. 1. The display includes a question 24, and three buttons 25, 26, 27 on each of which is written one of three possible answers to the question 24. An area 28 at the top of the screen is used to display a name, title or logo of the survey. As will be described below, the present invention includes a method for discriminating between a serious and a nuisance response to a survey by using a "same place touch" count.

Also shown in FIG. 2 are a series of horizontal grid lines 30 and a series of vertical grid lines 32. The grid lines 30, 32 are not displayed on the screen, but are invisible, or virtual, lines that have been defined by the survey operator to divide the screen into zones. It will be seen that some of the zones, such as zone 34, include parts of one or more of the buttons 25, 26, 27, while other zones, such as zone 36, are entirely clear of any of the buttons.

The zones, including zones 34 and 36, are rectangular zones defined by the grid lines 30, 32, which are either predefined, or are defined by the operator using the operator interface 22 (see FIG. 1). The specification of a number of horizontal grid lines 30 and a number of vertical grid lines 32 is a convenient way for the operator to divide the screen into defined rectangular zones, although other shapes of zone could be used and any of a variety of other methods could be used to define areas of the screen as zones.

In addition to defining zones, the operator defines three further parameters: a valid tap rating, an invalid tap rating and a same place touch threshold. In the example that will be described in association with FIGS. 2 to 5, it will be assumed that the operator has specified a valid tap rating of 1, an invalid tap rating of 3 and a same place touch threshold of 5.

Let us suppose that the question displayed in FIG. 2 is the first question in a survey and that a customer begins responding to the survey by touching the button 25 (answering "once" to the question "How many times do you visit the store?") at the location indicated by the circled numeral "1". This is in the zone 34, which includes part of button 25. As this is the first answer to the first question in a new survey response, the same place touch count is zero.

Figure 3:
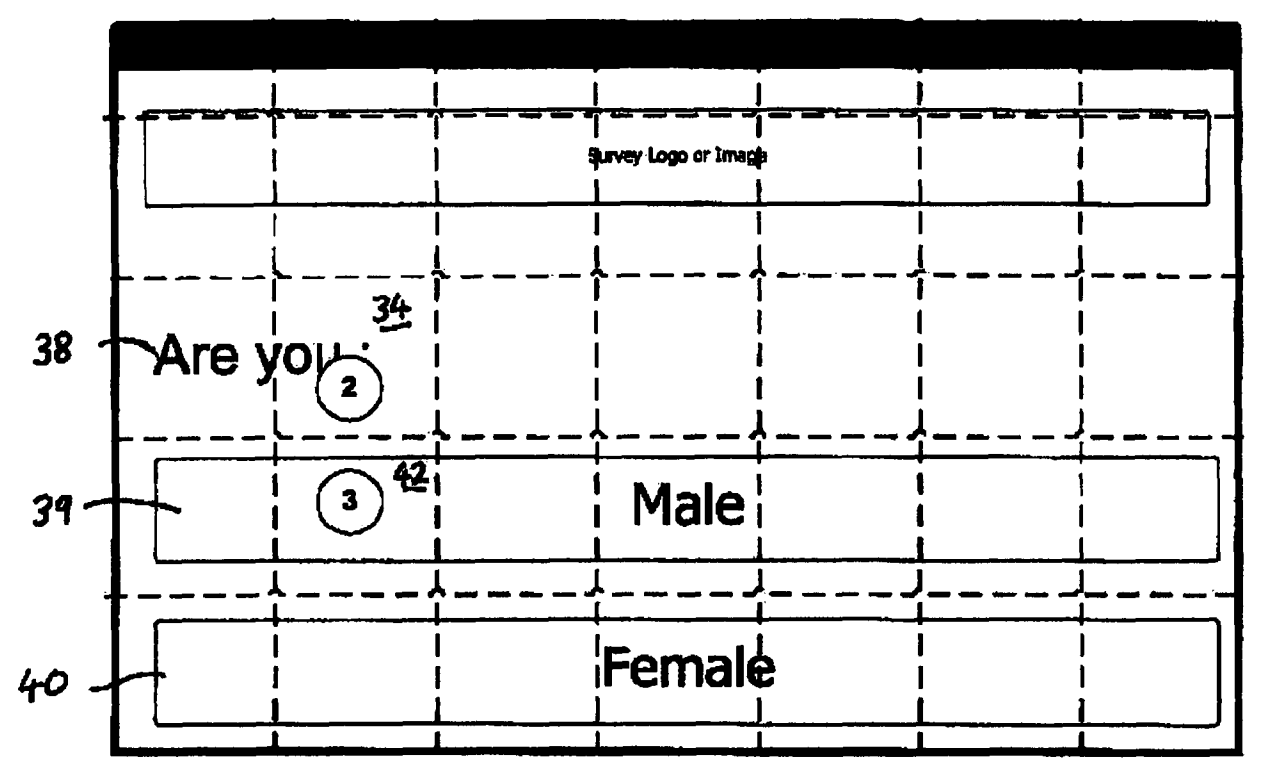

FIG. 3 shows the next screen display in the survey, with the second question 38 to which there are two possible answers indicated by the buttons 39 and 40. The customer touches the screen at the position indicated by circled numeral "2". This is in the same zone 34 as the previous screen touch, and so is a "same place touch". However, the zone 34 is clear of any buttons on this screen display and so the touch is an invalid screen touch. There will be no answer recorded for the touch, and the survey will not progress to the next screen. The same place touch count is therefore incremented by the invalid tap rating of 3. If the customer were to touch the screen again at this location, the same place touch count would be incremented by a further 3.

However, let us assume that the customer next touches the screen at the location indicated by circled numeral "3", which is in another zone 42 on the button 39 (answering "Male" to the question 38). This is a valid touch, and in a different location (different zone) to the previous touch, so the same place touch count is unchanged. The valid answer is recorded and the survey progresses to the next screen display, which is shown in FIG. 4.

Figure 4:
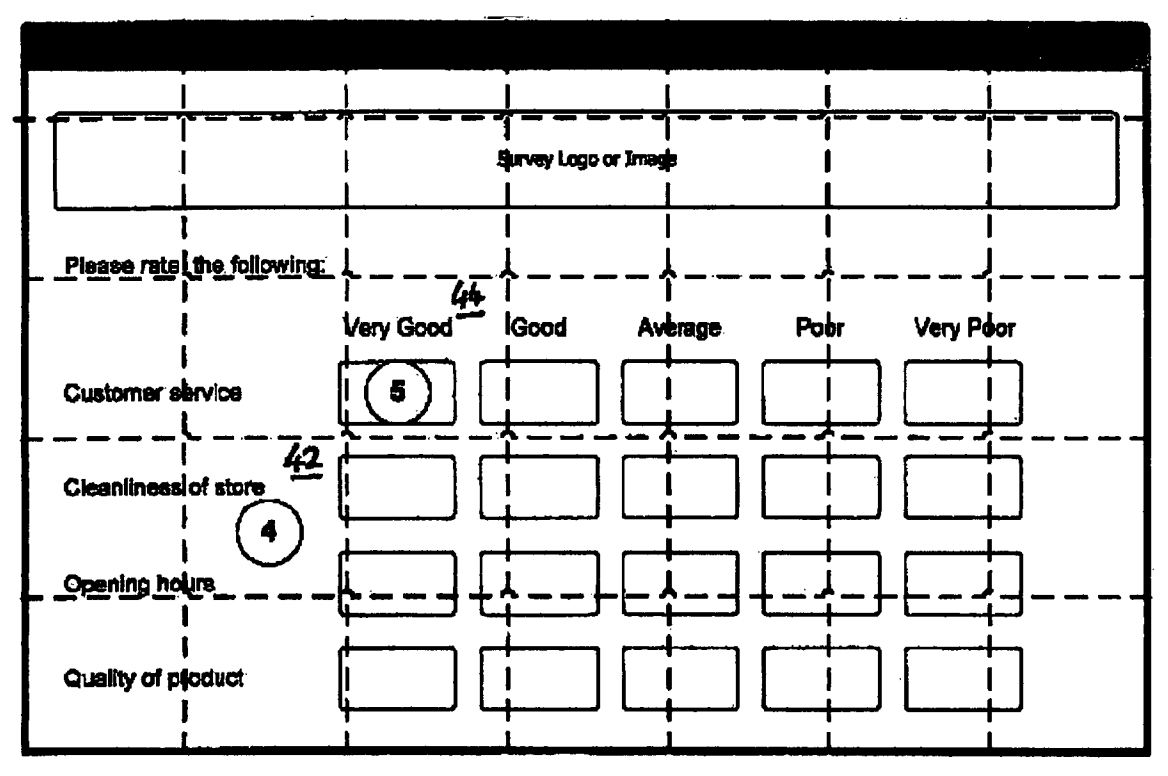

FIG. 4 shows the screen display for the next survey question, which is a multi-selection question requiring four separate answers by selection of one in a row of five different buttons for each answer. Let us suppose that the customer next touches the screen at the location indicated by circled numeral "4". This is the same location (in the same zone 42) as the previous touch, and so constitutes a same place touch, but is not a touch on a button and so is not a valid answer. Note that although there are parts of buttons in zone 34, the touch itself is not on one of these button parts, and so the touch itself is not a valid touch. The same place touch count is therefore incremented by 3 to a total of 6.

Let us assume that the customer then answers the questions correctly by touching one button on each row of five buttons and finishes by touching the screen at the location indicated by circled numeral "5". These are valid touches (on buttons) and although it is possible that two of these touches could be in the same zone, we will assume that none are in the same zone as the previous touch. The final touch indicated by circled numeral "5" is in zone 44, and as all of the multi-select questions have been answered, the survey will proceed to the next screen, which is shown in FIG. 5.

Figure 5:
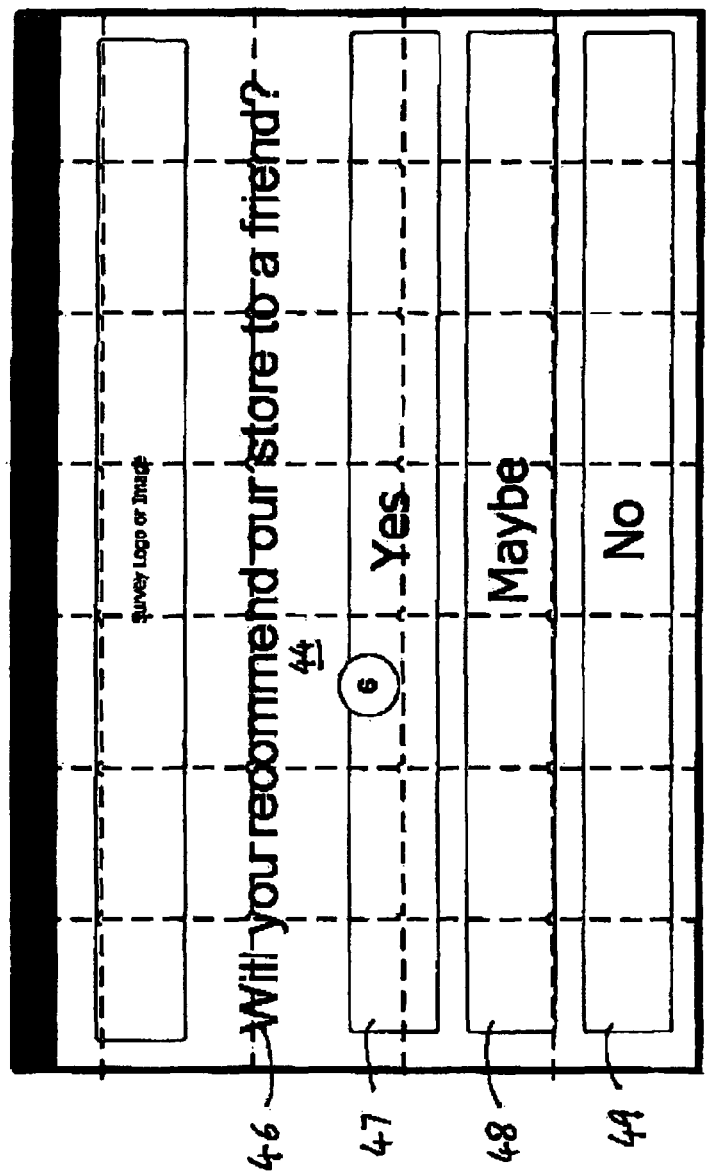

The screen display shown in FIG. 5 has one question 46 with three answer buttons 47, 48, 49. The question 46 is the last question in the survey. Let us assume that the customer touches the screen at the location shown by circled numeral "6". This is a valid touch because it is on button 47 and will result in the completion of the survey response. However, the touch is in the same zone 44 as the previous touch indicated by circled numeral "5" in FIG. 4. Therefore the same place touch count is incremented by the valid tap rating of 1, to a total tap rating of 7.

The threshold tap rating for this survey was set as 5. As this has been exceeded, the response will be quarantined.

Figure 6:
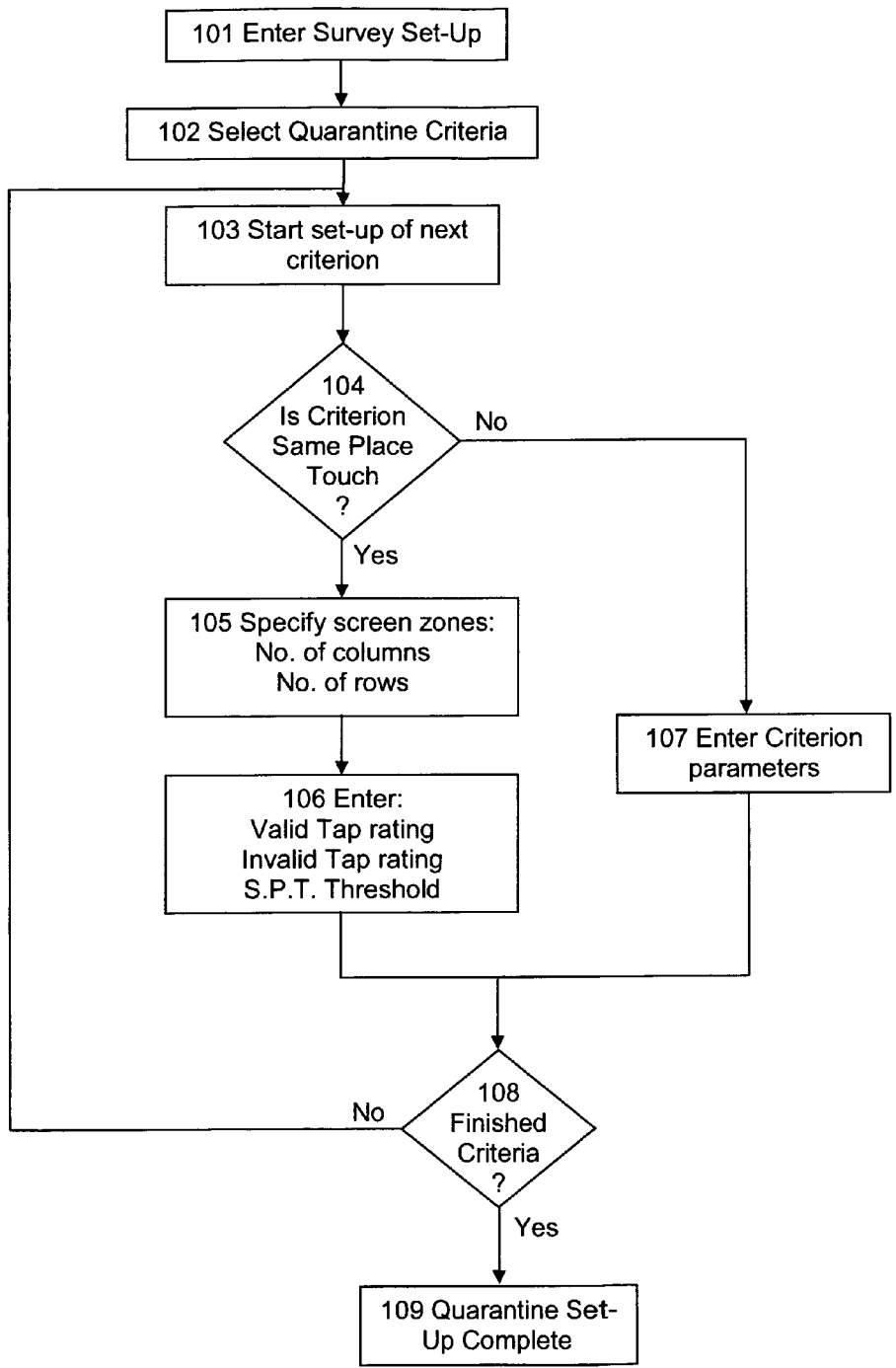
FIG. 6 is a flow diagram illustrating a touch screen survey quarantining method.

FIG. 6 is a flow diagram illustrating the process steps in setting up a touch screen survey to enable the quarantining of a survey response. At step 101, the operator enters the survey set-up using the operator interface 22 (see FIG. 1), and at step 102 selects the criteria to be used to quarantine responses to the survey. At step 103 the set up of the next criterion begins. If at step 104 it is determined that the next criterion is the Same Place Touch criterion, then at step 105 the operator specifies the screen zones. In this example this is done by specifying a number of rows and columns that make up a grid pattern of zones. At step 106, the operator enters the parameters Valid Tap Rating, Invalid Tap Rating and Same Place Touch (S.P.T.) Threshold. If at step 104 it was determined that the criterion is not Same Place Touch, but another criterion (for example Minimum Number of Questions Answered), then at step 107 the operator enters the required parameters for that criterion (e.g. the minimum number). Finally, at step 108, if there are more criteria to set up, the method returns to step 103 to set up the next criterion, otherwise the quarantine set-up is completed at step 109.

Figure 7:
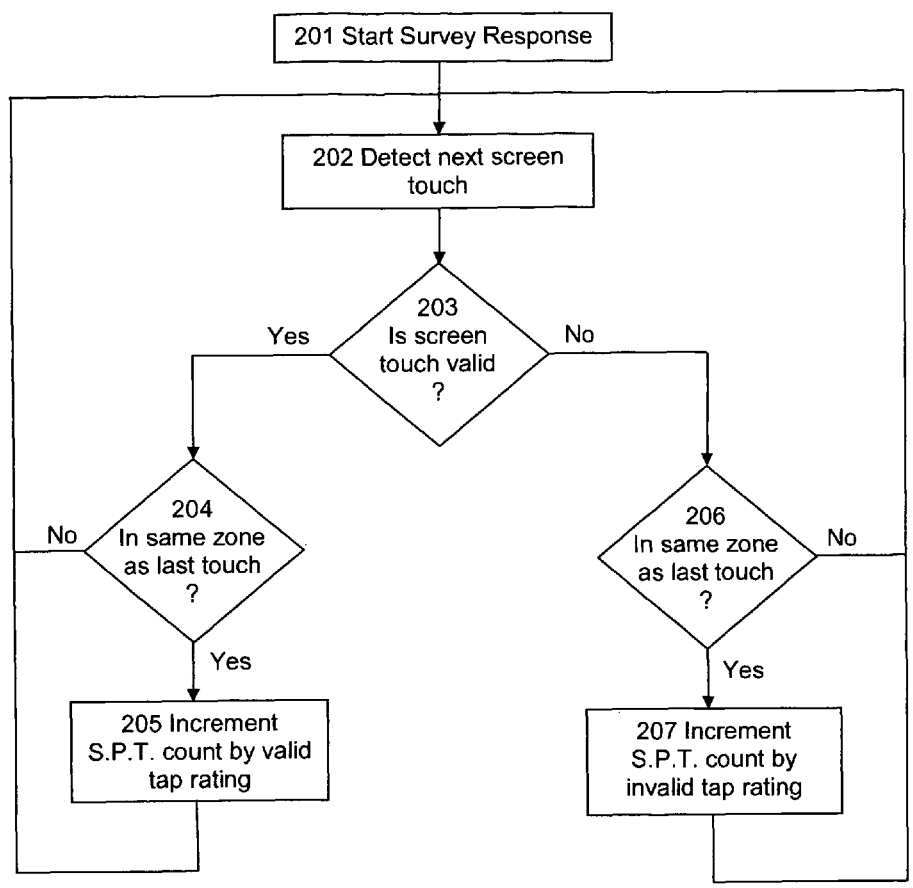
FIG. 7 is flow diagram illustrating a method for a same place touch criterion.

FIG. 7 is a flow diagram illustrating the process by which the system determines the Same Place Touch count for a response. At step 201a survey response commences and at step 202 the next screen touch is detected. If, at step 203, it is determined that the screen touch is valid (i.e. is on a button), then at step 204 a determination is made as to whether or not the touch is in the same zone as the previous touch. If it is not, then the method returns to step 202 to await detection of the next screen touch. If, at step 204, the touch is in the same zone as the previous touch, then at step 205 the S.P.T. count is incremented by the valid tap rating.

If, at step 203, it was determined that the touch was not valid (i.e. not on a button), then at step 206 a determination is made as to whether or not the touch is in the same zone as the previous touch. If it is not, then the method returns to step 202 to await detection of the next screen touch. If, at step 206, the touch is in the same zone as the previous touch, then at step 207 the S.P.T. count is incremented by the invalid tap rating. The process continues until the end of the survey where the total S.P.T. count is compared with the S.P.T. threshold to decide whether or not to quarantine the response.

The invention claimed is:
1. A method of discriminating
between valid and nuisance responses to a touch screen survey, wherein
the survey comprises a sequence of a plurality of screen displays each including a survey question and one or more screen buttons by means of which the user signifies an answer to the survey question by touching the screen button, and wherein the touch screen comprises a plurality of zones, each zone being an area of surface of the touch screen, the method comprising:

monitoring screen touches; determining a same place touch count depending on a zone at which the screen is touched and the number of consecutive touches in the zone on consecutive ones of said plurality of screen displays in said sequence of screen displays; comparing the same place touch count to a threshold; and determining if the response is valid or a nuisance response based on the comparison and quarantining the response if the determination is made that it is a nuisance response.

2. The method of claim 1 wherein determining the same place touch count comprises:
   identifying a screen touch as a valid tap when the user touches the screen in a zone that comprises a screen button, and assigning a valid tap rating to the screen touch;
   identifying a screen touch as an invalid tap when the user touches the screen in a zone that does not comprise a screen button, and assigning an invalid tap rating to the screen touch; and
   incrementing the same place touch count by an amount corresponding to the assigned tap rating.

3. The method of claim 1 further comprising defining the plurality of zones.

4. The method of claim 3 wherein defining the plurality of zones comprises specifying a grid of zones.

5. The method of claim 4 wherein the grid of zones is defined by specifying a number of horizontal grid lines and a number of vertical grid lines.

6. The method of claim 4 wherein the grid of zones is defined by specifying a number of rows of and a number of columns in the grid.

7. The method of claim 1 wherein the zones are pre-defined.

8. The method of claim 1 wherein the determining the same place touch count comprises determining the same place touch count of the number of the consecutive touches having time separation between the consecutive touches.

9. The method of claim 8 wherein the determining the same place touch count comprises determining the same place touch count of the consecutive touches individually resulting from the user touching the screen.

10. The method of claim 1 wherein determining the same place touch count comprises:
    identifying one of the screen touches as a valid tap when the user touches the screen in the one of the zones that comprises a screen button, and assigning a valid tap rating to the one screen touch;
    identifying another of the screen touches as an invalid tap when the user touches the screen in another of the zones that does not comprise a screen button, and assigning an invalid tap rating to the another screen touch; and
    incrementing the same place touch count by an amount corresponding to the assigned tap rating.

11. A touch screen survey apparatus comprising: a touch screen operable to detect a location of the touch screen surface touched by a user and to display the survey as a sequence of a plurality of screen displays each including a survey question and one or more screen buttons by means of which the user signifies an answer to the survey question by touching a screen button, and wherein the touch screen comprises a plurality of zones, each zone being an area of surface of the touch screen; and a processor operable to control the presentation of the screen displays, to monitor screen touches, to determine a same place touch count depending on the zone at which the screen is touched and the number of consecutive touches n the zone on consecutive ones of said plurality of screen displays in said sequence of screen displays, to compare the same place touch count to a threshold, and to determine if the response is valid or a nuisance response based on the comparison and wherein the processor is further operable to quarantine the response if the determination is made that it is a nuisance response.

12. The apparatus of claim 11 further comprising an operator interface operable for entering a valid tap rating and an invalid tap rating, and wherein the processor is operable to: identify a screen touch as a valid tap when the user touches the screen in a zone that comprises a screen button; identify the screen touch as an invalid tap when the user touches the screen in a zone that does not comprise a screen button; and to increment the same place touch count by an amount corresponding to the tap rating of the screen touch.

13. The apparatus of claim 12 wherein the operator interface is operable for entering instructions including definition of a plurality of zones, each zone being an area of surface of the touch screen and/or a threshold same place touch count.

14. The apparatus of claim 11 comprising a computerised touch screen survey device such as a personal computers, Tablet PC, personal digital assistants or a touch screen terminal.

15. The apparatus of claim 11 wherein the processor is operable to determine the same place touch count of the number of the consecutive touches having time separation between the consecutive touches.

16. The apparatus of claim 15 wherein the processor is operable to determine the same place touch count of the consecutive touches individually resulting from the user touching the screen.

17. A method of quarantining responses to a computerised survey, wherein the survey comprises a sequence of a plurality of screen displays each including a survey question and one or more screen buttons by means of which the user signifies an answer to the survey question by touching the screen button, the method comprising:
    defining a set of criteria for identifying if a response is likely to be a serious response or a nuisance response, the criteria are based on the number of survey questions answered and the timing between consecutive answers to survey questions on consecutive ones of said plurality of screen displays in said sequence of screen displays;
    monitoring the screen touches to determine the number of survey questions answered and the time intervals between screen touches;
    comparing the monitored responses with the defined criteria to categorise the response as a likely nuisance response or a likely serious response; and
    quarantining the response if it is categorised as a likely nuisance response.

18. The method of claim 17 wherein the criteria include one or more of:
    a maximum number of answers in a time period;
    a minimum time between survey responses;
    a minimum number of questions answered;
    a maximum time between answers;
    a minimum number of selected answers to a question where multiple answers can be provided;
    a maximum number of selected answers to a question where multiple answers can be provided;
    a maximum number of screen touches in the same screen location;
    a maximum number of touches to a "previous screen" or "previous question" button;
    bad language used in a response;

repeating letter sequences in a response;
repeat pressing of a "previous" button;
an out of hours response entry;
conflicting answers.

19. A method of discriminating between valid and nuisance responses to a touch screen survey, wherein the survey comprises a sequence of a plurality of screen displays each including a survey question and one or more screen buttons by means of which the user signifies an answer to the survey question by touching the screen button, and wherein the touch screen comprises a plurality of zones, each zone being an area of surface of the touch screen, the method comprising:

monitoring screen touches; detecting a number of consecutive touches within a same one of the plurality of zones wherein each of said consecutive touches is a touch on a consecutive one of said plurality of screen displays in said sequence of screen displays;

determining a same place touch count using the detected number of consecutive touches within the same one of the plurality of zones; comparing the same place touch count to a threshold; and determining if the response is valid or a nuisance response based on the comparison and quarantining the response if the determination is made that it is a nuisance response.

\* \* \* \* \*